(12) United States Patent
Van Brunt et al.

(10) Patent No.: US 8,215,474 B1
(45) Date of Patent: Jul. 10, 2012

(54) INLINE ACCUMULATION AND CONVEYOR INTEGRATION SYSTEM AND METHOD

(75) Inventors: Timothy P. Van Brunt, Greenwood, AR (US); Roger D. Pugh, Fort Smith, AR (US)

(73) Assignee: Roger D. Pugh, Fort Smith, AR (US)

( * ) Notice: Subject to any disclaimer, the term of this patent is extended or adjusted under 35 U.S.C. 154(b) by 327 days.

(21) Appl. No.: 12/603,394

(22) Filed: Oct. 21, 2009

Related U.S. Application Data

(60) Provisional application No. 61/107,267, filed on Oct. 21, 2008.

(51) Int. Cl.
*B65G 1/00* (2006.01)
(52) U.S. Cl. .......... 198/347.1; 198/347.4; 198/448; 198/575
(58) Field of Classification Search .......... 198/347.1, 198/347.4, 419.3, 448–449, 575, 601
See application file for complete search history.

(56) References Cited

U.S. PATENT DOCUMENTS

| | | | | |
|---|---|---|---|---|
| 3,118,549 | A * | 1/1964 | Hoellen | 198/347.4 |
| 4,917,228 | A * | 4/1990 | Ichihashi et al. | 198/347.4 |
| 5,582,282 | A * | 12/1996 | Focke et al. | 198/347.1 |
| 5,884,749 | A * | 3/1999 | Goodman | 198/419.3 |
| 6,131,372 | A * | 10/2000 | Pruett | 53/448 |
| 6,425,476 | B2 * | 7/2002 | Ghiotti et al. | 198/426 |
| 6,513,641 | B1 * | 2/2003 | Affaticati et al. | 198/357 |
| 7,303,059 | B2 * | 12/2007 | Pugh | 198/448 |
| 7,565,963 | B2 * | 7/2009 | Cholet et al. | 198/560 |
| 7,909,155 | B2 * | 3/2011 | Lupton et al. | 198/357 |
| 2006/0163037 | A1 * | 7/2006 | Fujimura et al. | 198/575 |

* cited by examiner

*Primary Examiner* — Mark A Deuble
(74) *Attorney, Agent, or Firm* — Gardere Wynne Sewell LLP

(57) ABSTRACT

An accumulation and conveyor integrations system is provided which incorporates at least two separated conveying apparatus to convey, accumulate, and meter the output of product onto a downstream line. When a downstream apparatus goes offline, a method of controlling reentry or integration of upstream and downstream lines is provided. The system and method can maximize product output from the downstream line by enabling continued loading of an upstream conveyor at a given rate and subsequent downloading at a temporary increased rate.

14 Claims, 4 Drawing Sheets

INLINE ACCUMULATION AND CONVEYOR INTEGRATION SYSTEM AND METHOD

CROSS-REFERENCE TO RELATED APPLICATIONS

This application claims priority to U.S. provisional patent application Ser. No. 61/107,267 filed Oct. 21, 2008, which is hereby incorporated herein in its entirety.

FIELD OF THE INVENTION

The present invention relates generally to conveying of items on a conveyer system and more particularly to integrating multiple drive units into an efficient conveyor system.

BACKGROUND OF THE INVENTION

Efficient transport of goods through a conveyor system is an essential part of numerous industries. Conveyor systems can be quite complex made up of multiple drive units, belt segments, turns and grades. In manufacturing or other conveyor processes different flows must be integrated with each other. For example, a finished assembled product may be the result of multiple subprocess steps. The time required for the completion of each subprocess step may very across subprocesses, or may vary within a given subprocess.

The downtime of any downstream conveyor or subprocess may affect the flow of an upstream conveyor subprocess. If a third subprocess step breaks down or goes off line for a period of time, a conveyor for an upstream second subprocess may become overloaded as the product, which has finished the second subprocess, cannot be received by the downstream third subprocess. To avoid overloading, an upstream drive section or subprocess step may need to be taken offline.

Conventional complex processing conveyor systems may employ various methods of holding patterns or stockpiling to manage differential or intermittent subprocess flows. Methods and systems to manage variations in subprocess conveyor flows to maximize a finished product are in constant pursuit.

Other restrictions or design considerations for a complex conveyor system may include total floor space available and dimensional constraints in one or more directions. Modification to an existing conveyor system may be desirable, for example, if a finishing product station is changed to a different type. Automation of an upstream process of upstream loading may create an opportunity for increased production with system modification. Modifications may be desired in a conventional system to achieve, for example, a daily system output goal when an end or interim subprocess or section conveyor is operated intermittently.

Still other multistep product processes, which employ multiple conveyor drive units may have time sensitive steps, such that an upstream process must continue or run at a given speed regardless of a pause in an downstream conveyor or subprocess.

SUMMARY OF THE INVENTION

The present invention addresses some of the issues presented above by providing a dual inline conveyor section which is integrated into a downstream conveyor section using a unique controller logic.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein.

DETAILED DESCRIPTION OF THE INVENTION

Figure 1:
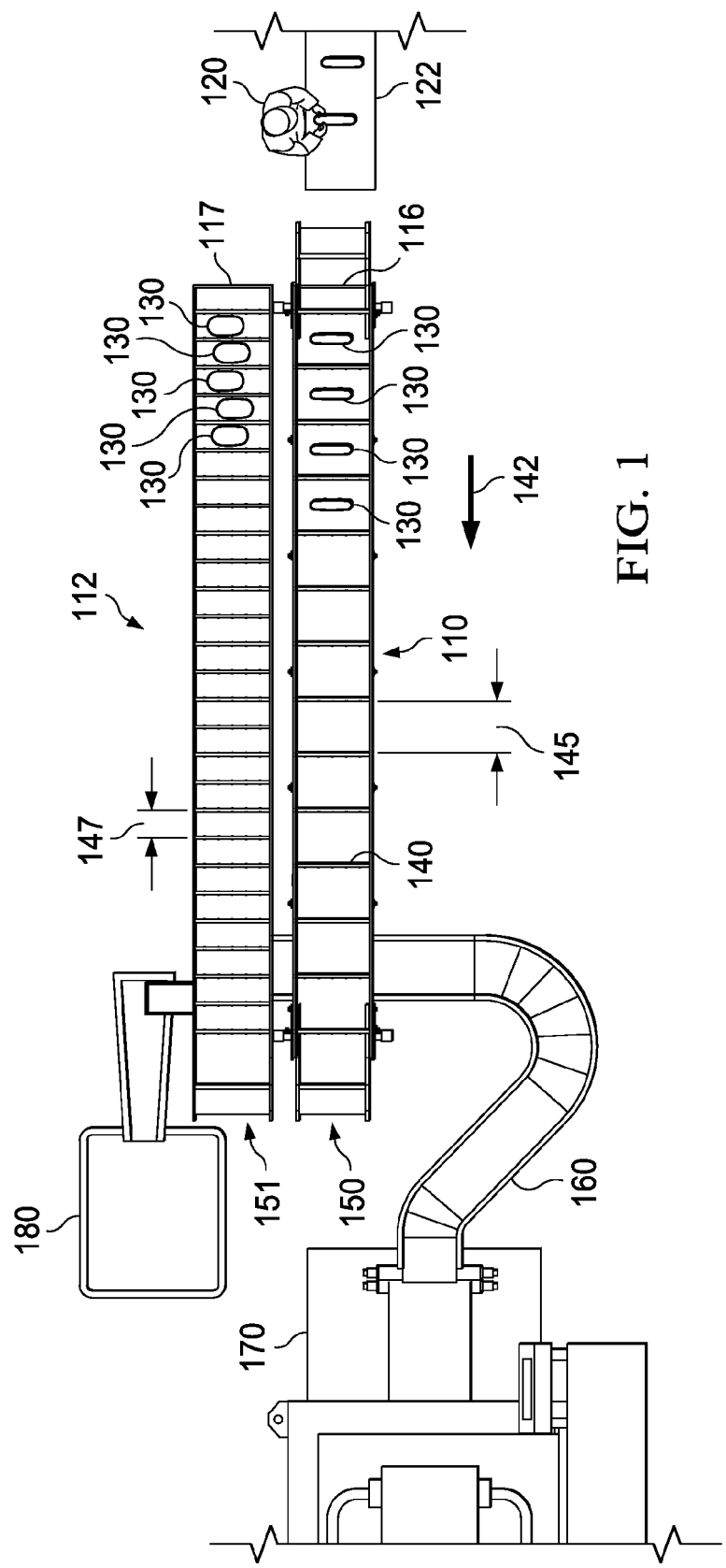
FIG. 1 is a plan view showing parallel inline conveyor sections feeding into a downstream finishing conveyor section in accordance with an exemplary embodiment of the present invention.

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention.

A Straight Inline Accumulation System (SIAS), in accordance with an embodiment of the present invention, may be comprised of two separate conveying apparatus to convey, accumulate, and meter the output of product onto a downstream line. An SIAS in accordance with embodiments of the present invention can maximize a finished product output compensating for off line time of a finishing station by providing an accumulation mechanism for an upstream process and subsequent integration of the accumulated product into the downstream flow.

Some aspects of the present invention are described below, while still other attributes of the present invention are not particularly listed as aspects. And further, any one embodiment of the present invention may not include the below provided aspects or may include any combination of summarized aspects.

An aspect of the present invention may provide a normal flow conveyor section. Another aspect of the present invention may provide a normal flow conveyor with a nose-over turn enabling integration with an upstream conveyor while maintaining an inline configuration. Another aspect of the present invention may provide an accumulator conveyor section parallel to the normal flow section. Another aspect of the present invention may provide a nose-over section at a downstream end of the accumulator conveyor section enabling integration with a downstream conveyor while maintaining an inline configuration.

Another aspect of the present invention may accommodate for a pause in a downstream conveyor by manipulating an upstream conveyor section. Yet another aspect of the present invention may provide control logic to assess the presence of product at discrete intervals in a normal flow conveyor section. Yet another aspect of the present invention may assess the presence of product in an accumulator conveyor line. Yet another aspect of the present invention may discriminate the absence of product at discrete intervals in either of the normal or accumulator conveyor systems.

Yet another aspect of the present invention may provide a controller to regulate the feed of a normal and an accumulator conveyor section into a downstream section to enable a maximum output by the downstream section. Yet another aspect of the present invention may provide a controller to regulate the feed of a normal and an accumulator conveyor section into finishing conveyor section to provide an increased or maximum finished product. And yet another aspect of the present invention may provide a system which enables a manual loader on an upstream conveyor to maintain a given feed rate into an upstream conveyor section when a connecting downstream conveyor is off line.

In yet another aspect, the present invention provides a method of maximizing product output of a conveyor system where a normal flow line is provided moving at a constant speed and the flow line includes multiple spaced apart partitions forming segregated units wherein each unit is sized to receive a product, loading the normal flow segregated units with product and identifying a loaded product and its segregation unit, providing a downstream line for receiving product deposited from the normal flow line, detecting a pause in a downstream line; halting the normal flow line in response to the detected pause in the downstream line, providing an upstream accumulator line moveable at variable speed parallel with the normal flow line and having multiple spaced apart partitions forming segregated units, wherein the spaced apart distance of adjacent accumulator partitions is less than the spaced apart distance between adjacent normal flow partitions, indexing the accumulator line forward one segregation, presenting an empty, segregation for product loading product into the segregated unit of the upstream accumulator line, restarting the downstream line, and moving product in the accumulator line downstream and downloading product onto the downstream line. The normal flow segregated units and its associated product are identified using control logic which may be a controller and one that tracks the location of each product in the normal flow line and the accumulator line congruently. The loading of the normal flow segregated units is automatic and responsive to controller input, as may be the loading accumulator line segregated units, or both. Further, the controller input may be responsive to a pause in movement of the normal flow line. Automatic loading of the accumulator line segregated units is in response to controller input responsive to a pause in movement of the normal flow line or the downstream line. And the accumulator line segregated units may be spaced apart less than the spaced apart distance of the normal flow segregated units, and in one embodiment, one-half the distance. The normal flow line runs at a rate less of the indexing rate of the accumulator flow line and in a preferred aspect, one-half the rate. And product is unloaded from either the normal flow or the accumulator line to the downstream line in response to controller input.

Figure 3:
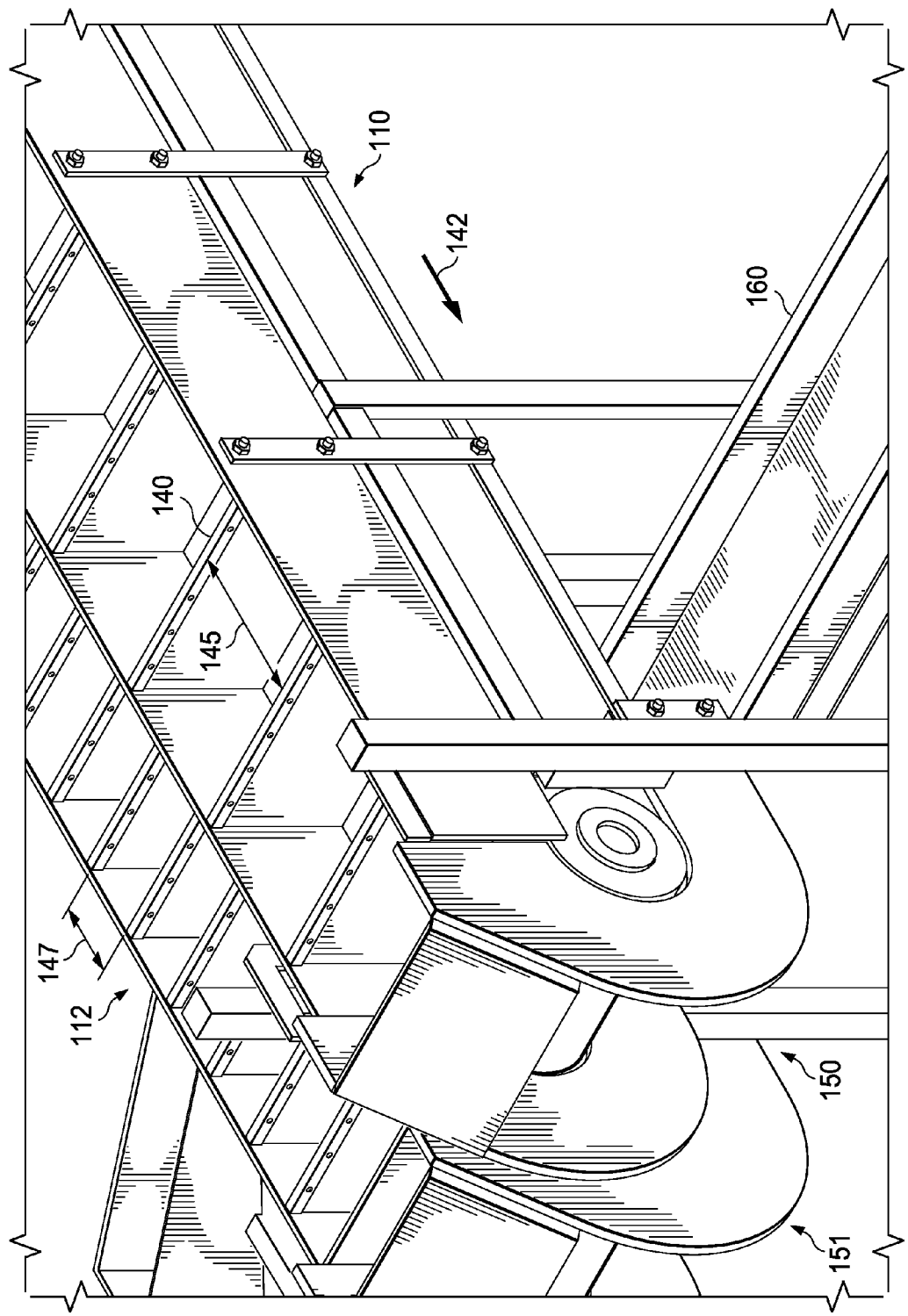
FIG. 3 is another perspective view of FIG. 2 showing greater detail of the noseover sections and downstream line.

FIG. 1 shows in plan view parallel inline conveyor sections feeding into a downstream finishing conveyor 160 section comprising a normal flow line (NFL) 110 section and an accumulator flow line (ACL) 112 section. In one exemplary embodiment, shown for example in FIG. 1, the upstream feed end 116 may be manually 120 loaded from a prep station 122. During normal operation, product 130 is loaded onto the NFL 110. The NFL moves at a desired constant speed in the flow direction shown 142. A nose-over section 150, shown in greater detail in FIG. 3, is used to maintain a straight line configuration while feeding into a downstream conveyor 160 section. In the exemplary embodiment shown in FIG. 1, a finishing station 170 receives the product from the downstream line 160 and provides a finished product. In alternate embodiments, the NFL may feed directly into a finishing station 170. In yet other embodiments, the downstream line 160 may be one of several subsequent conveyor sections integrated into one large conveying system.

Figure 2:
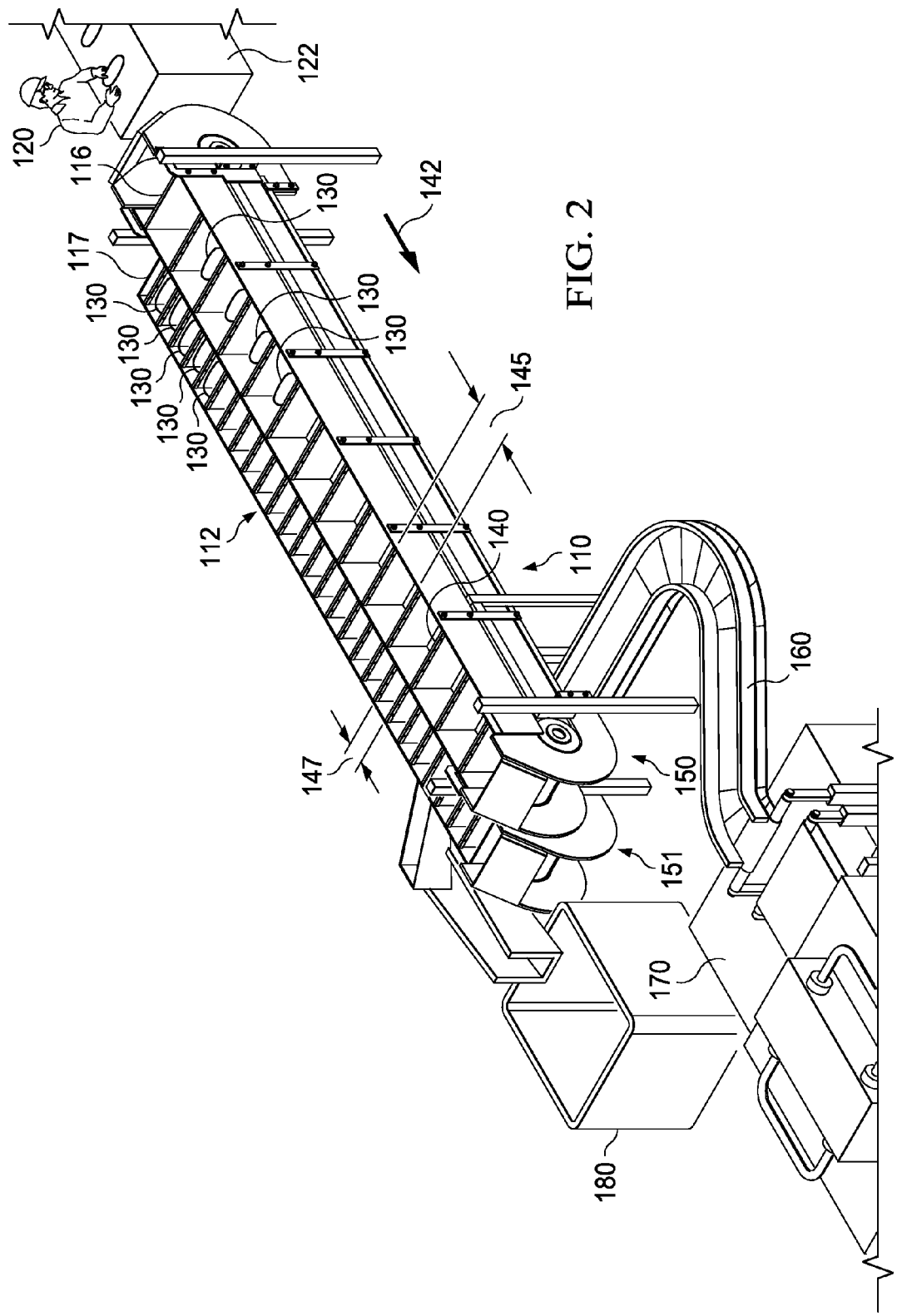
FIG. 2 is a perspective view of the invention shown in FIG. 1.

When the downstream line goes off line, then the NFL stops and the loader 120 begins loading the ACL 112. Depending on the loading mechanism, switch to loading of the ACL versus the NFL may be automatic upon stopping of the NFL. The ACL runs bidirectionally and at a variable speed such that it indexes forward one flight space 147 upon detection of product placement at the ACL upstream feed end 117. Like the NFL 110, the ACL 112 uses a nose-over section 151, shown in greater detail in FIG. 3, to download product onto the downstream line 160. When the downstream line 160 resumes, the ACL is indexed forward as needed, moving the leading product in the position for unloading into the downstream line. FIG. 2 is perspective view image of an accumulator line feeding into a downstream line. A modular flighted plastic belt is used to provide product segregation, and a nose-over hood is shown on the right to control product flow about its 180 degree turn before being loaded onto the downstream belt running perpendicular and beneath the accumulator line. As the conveyed product traverses the 180 degree turn it may fall away from the belt surface and rest upon the hood, while being pushed forward by the respective hind flight.

An SIAS governs flow using programmable flow control logic in accordance with an embodiment of the present invention. Through the use of segregation identifiers, product identifiers, and software, the present invention determines how many segregations are in each lane and where products reside on a conveyor line during operation. In accordance with one embodiment, if product is put into a lane, the software assigns a product present code to that individual segregation. At startup the NFL starts running at a constant speed which may be determined by a mathematical calculation of processing line throughput capacity in pieces per minute multiplied by the distance in inches of the product segregation resulting in a value of inches per minute. This resultant value may be divided by 12 to give a result in feet per minute (FPM). This FPM calculation can be used as a constant speed for the NFL. Downstream equipment with a capacity throughput rate greater than the normal processing line throughput enables an efficient SIAS in accordance with the present invention. Programmable control logic is commonly known to one of ordinary skill in the art and one preferred is Rockwell Automation RS Logix5000 although others may be used instead or in combination therewith.

The system works by having a normal flow lane 110 and an accumulation lane 112, as shown, for example, in FIG. 1. Under normal operational mode, the product is presented to the normal flow lane where product segregations, such as flight partitions 140, provide separated product and flow to the downstream equipment at a rate less than the downstream's 160 maximum output capacity. If the downstream line stalls, for example, because of mechanical breakdown or is stopped to permit changes in packaging or employees, the normal product flow lane 110 can be stopped. Any product currently in the NFL que to be distributed to the downstream equipment will remain in its current position to be distributed after the downstream equipment comes back online after an operational ready signal is received.

When the normal flow lane 110 is stopped, product may be automatically presented to the accumulation lane 112. The accumulator line 112 may operate in a standby mode during normal operation. Product segregations in the accumulator apparatus may be at the minimum to maximize potential accumulation of product for a given straight line space on a processing floor. In the example shown in FIGS. 1 through 3, the accumulator flight space 147 is about one-half of the normal flow flight spacing 145, however, the space can be one-third, one-fourth or less, depending on the product size, weight and other factors known to one of skill in the art. The accumulator line includes sensors (not shown) that recognize when product is in the segregation zone and moves forward one zone, or flight spacing, to maintain an open space at the upstream end 117.

Once a ready signal is received from the downstream equipment or the downstream line otherwise comes back online, the accumulator line may be automatically indexed to the unload position by the control logic in accordance with an embodiment of the present invention. Process control logic tracks the location of each product in both lanes congruently. The downstream flow rate can be increased and fed by the accumulator line to temporarily increase a finished product output rate until the accumulator line is empty. By raising the downstream line to a rate affording a maximum finishing output and running the ACL at a corresponding rate, output can be maximized until the ACL is unloaded. The NFL can also be resumed, running at a constant speed, and be unloaded by pausing the indexing of the ACL for interim unloading of the NFL. The NFL may unload at a rate of, for example, one-half of the indexing rate of the ACL, but the NFL unload rate may be one-third or one-fourth or as desired of the ACL unload rate. Conversely, the ACL may unload at a rate of, for example, one-half of the indexing rate of the NFL, but the ACL unload rate may be one-third or one-fourth of the NFL unload rate or also as desired. It may be further desired to run the ACL and the NFL alternately until the ACL is cleared depending on the loading conditions of the NFL.

Integration of the unloading of the NFL and ACL line is enabled by the present invention in accordance to one exemplary embodiment as follows. The positions of the NFL flights and product in the NFL lane are known as noted above. When the NFL resumes running after an interlude of ACL loading product will be move into the unload position as the NFL runs at a constant speed. The ACL will be indexing to maximize the output of the downstream equipment. As a product rounds the nose-over section on the NFL line it rests on the bottom of the hood and a hind flight of the NFL will push it off and onto the hood and onto the downstream equipment. Since the position of the hind flight, the presence of product between the flights, and the rate of the NFL are known the timing of an unloading of the NFL is known and the ACL indexing is paused to afford interim unloading of the NFL.

In accordance with and embodiment of the present invention, an SIAS may then maximize the output of the downstream equipment by distributing the product from the normal flow lane at the process rate and supplement the normal flow with the accumulated product. While there is still product in the ACL, if the downstream equipment goes offline, again, the ACL may reverse flow. The ACL may back up until the most upstream product is one segregation ahead of the upstream feed end 117 to allow further consecutive loading of products into the ACL. This method avoids any intermittent unloaded spaces in the ACL. It is to be noted that the partitioned zones do not have to be in one congruent piece of equipment to function properly. There can be a number of zone batteries that can be loaded so long as the unloading is metered, proportionate, and accurate. Alternate batteries would be particularly desirable when the downstream equipment has not come online by the time the ACL is full to avoid having to stop the upstream processing line.

Figure 4:
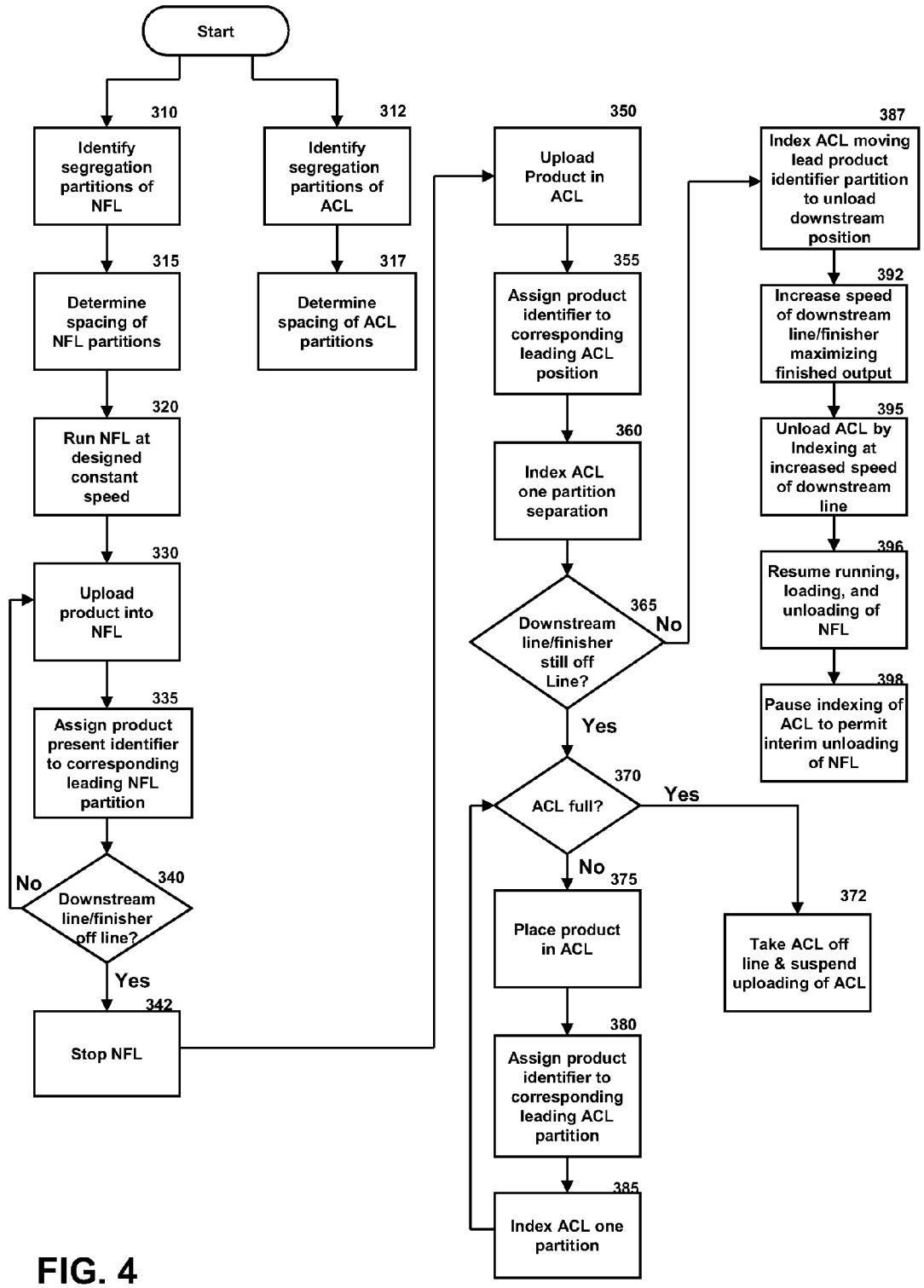
FIG. 4 shows a block diagram of a controller method in accordance with an embodiment of the present invention.

FIG. 4 shows a block diagram of a control method for a conveyor integration system in accordance with an exemplary embodiment of the present invention. In the control method, control logic identifies segregation units or partitions 310 and the spacing of the NFL partitions are determined 315. The speed is calculated and the NFL is run at the calculated or designed constant speed in step 320 where product is uploaded on the product's respective partition/unit on the NFL in step 330. The next step is to assign a product-present identifier to the corresponding leading NFL partition and is identified as step 335. If it is determined that the downstream line is offline at decision point 340, the NFL is stopped at step 342. If the downstream line is online, the process is reiterated at step 330. Segregation partitions/units are also identified of the ACL are also identified at the start in step 312 and the spacing is determined at step 317.

With continuing reference to FIG. 4 and referring back to step 342 for stoppage of the NFL, product is now uploaded to the ACL in step 350. The next step is to assign a product-present identifier to the corresponding leading ACL partition and is identified as step 355. The ACL is indexed one partition 360. At decision point 365, if the downstream line is back online, and the ACL is not full, see 370, product is placed in the ACL at step 375 and step 355 is reiterated, now identified as step 380, and the ACL is indexed one partition/unit in step 385.

If at decision point 365, if the downstream line comes back online, the ACL is indexed to move the leading product identified in partition to unload downstream in step 387 and the ACL speed may be increased to maximize finished output as shown in step 392. Product is unloaded by indexing in step 395 and resume running, loading and unloading of the NFL in step 396 while pausing the indexing of the ACL, step 398. If at decision point 370 the ACL is full, then the ACL is taken offline and is no longer loaded, step 372, in which case alternate zone batteries may be used as noted previously.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. A method of maximizing product output of a conveyor system, the method comprising:
   providing an upstream normal flow line moving at a constant speed, wherein said flow line includes multiple spaced apart partitions forming segregated units wherein each unit is sized to receive a product;
   loading the normal flow segregated units with product and identifying a loaded product and its segregation unit;
   providing a downstream line for receiving product deposited from the normal flow line;
   detecting a pause in the downstream line;
   halting the normal flow line in response to the detected pause in the downstream line;
   providing an upstream accumulator line moveable at variable speed and parallel with the normal flow line, having multiple spaced apart partitions forming segregated units, wherein the spaced apart distance of adjacent accumulator partitions is less than the spaced apart distance between adjacent normal flow partitions;

indexing the accumulator line forward one segregation, presenting an empty segregation unit for product loading product into the segregated unit of the upstream accumulator line;

restarting the downstream line; and moving product in the accumulator line downstream and downloading product onto the downstream line.

2. The method of claim 1, the step of loading normal flow segregated units wherein product and its respective unit are identified using control logic.

3. The method of claim 2, wherein said control logic is a controller.

4. The method of claim 3, wherein the controller tracks the location of each product in the normal flow line and the accumulator line congruently.

5. The method of claim 4, the step of loading normal flow segregated units wherein loading is automatic and responsive to controller input.

6. The method of claim 4, the step of loading accumulator line segregated units wherein loading is automatic and responsive to controller input.

7. The method of claim 5, wherein controller input is responsive to a pause in movement of the normal flow line.

8. The method of claim 3, the step of automatic loading of accumulator line segregated units wherein automatic loading is in response to controller input responsive to a pause in movement of the normal flow line or the downstream line.

9. The method of claim 3, wherein the accumulator line segregated units are spaced apart one-half or less than the spaced apart distance of the normal flow segregated units.

10. The method of claim 9, wherein the normal flow line runs at one-half or less of the indexing rate of the accumulator flow line.

11. The method of claim 3, wherein product is unloaded from either the normal flow or the accumulator line responsive to controller input.

12. The method of claim 10, wherein the downstream line is below and oriented perpendicularly to the normal flow line.

13. The method of claim 12, wherein the downstream line is below and oriented perpendicularly to the normal flow line and the accumulator line.

14. The method of claim 10, wherein the downstream line is integrated with the normal flow line.

* * * * *